No. 711,800. Patented Oct. 21, 1902.
W. H. TERLINDE.
GLASS BLOWING MACHINE.
(Application filed Nov. 4, 1901.)
(No Model.) 5 Sheets—Sheet 1.

WITNESSES: INVENTOR
William H. Terlinde
BY
ATTORNEYS

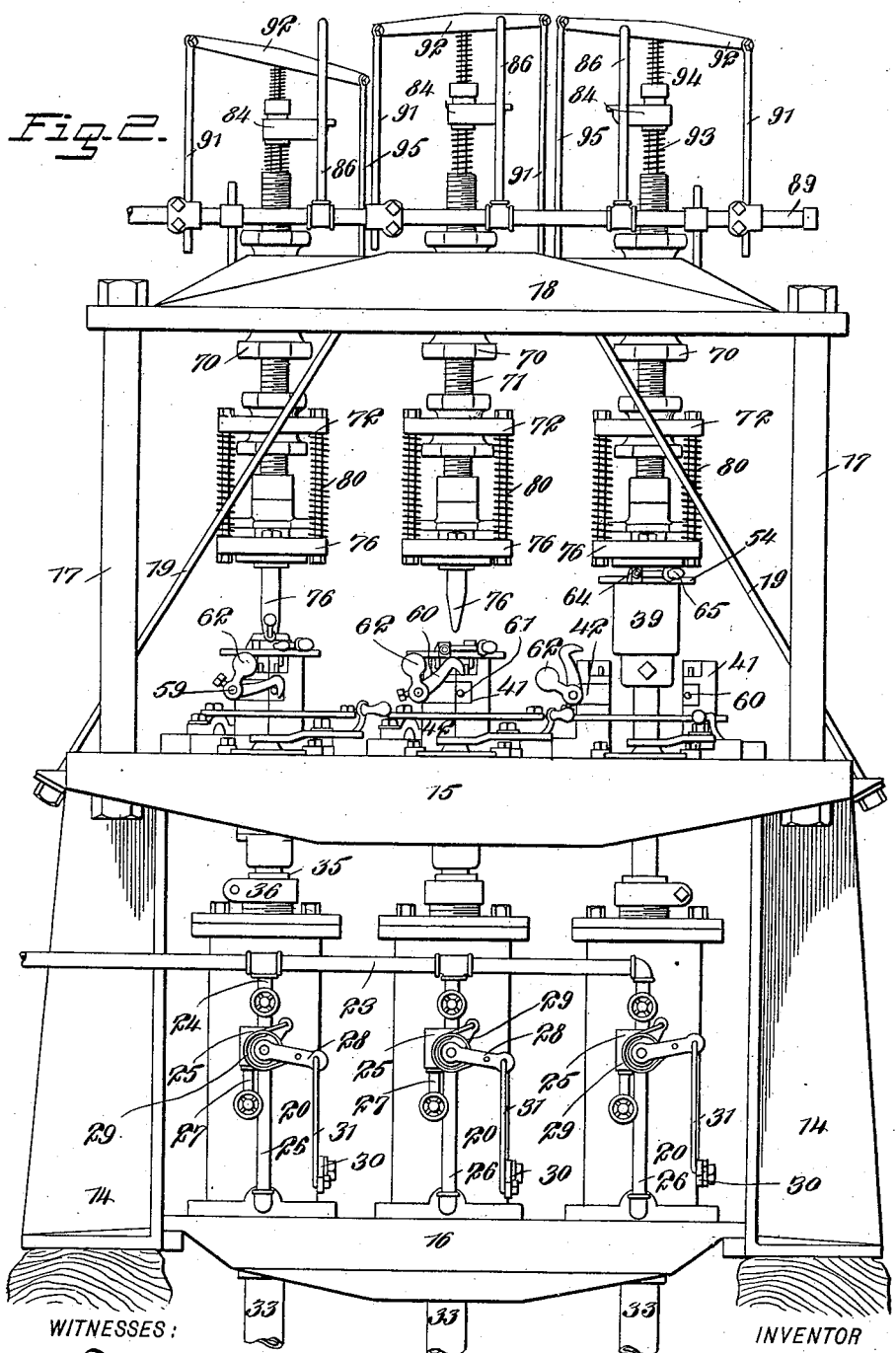

No. 711,800.　　　　　　　　　　　　　　　Patented Oct. 21, 1902.
W. H. TERLINDE.
GLASS BLOWING MACHINE.
(Application filed Nov. 4, 1901.)
(No Model.)　　　　　　　　　　　　　　　　　　5 Sheets—Sheet 3.
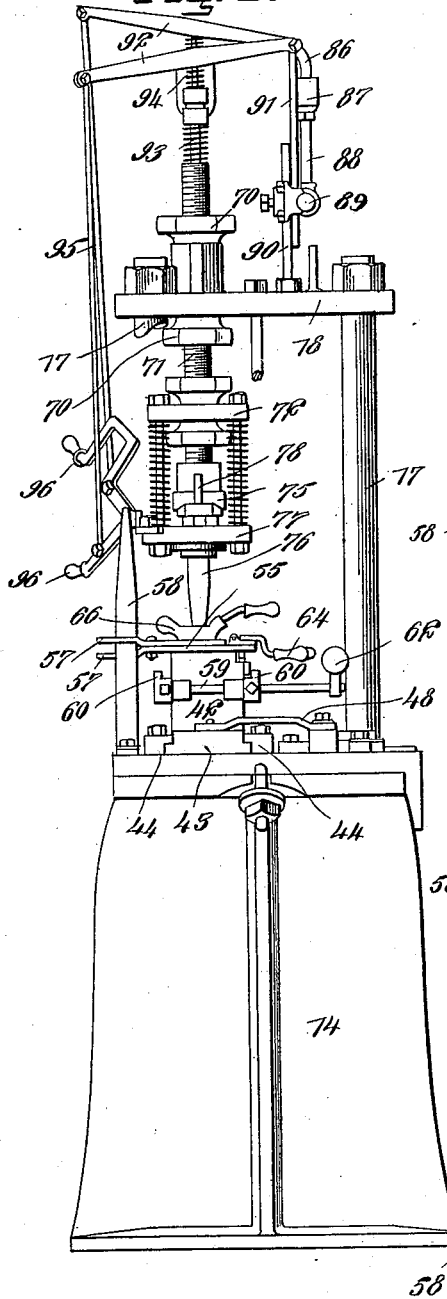
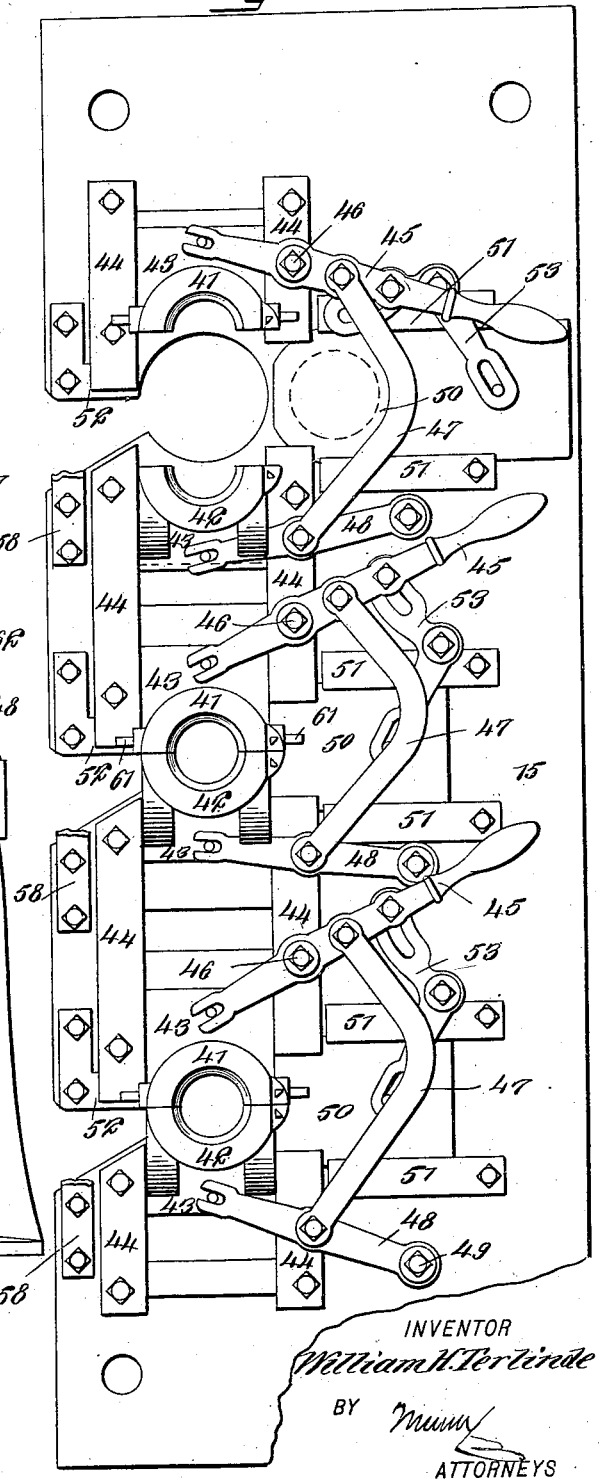
WITNESSES:
INVENTOR
William H. Terlinde
BY
ATTORNEYS

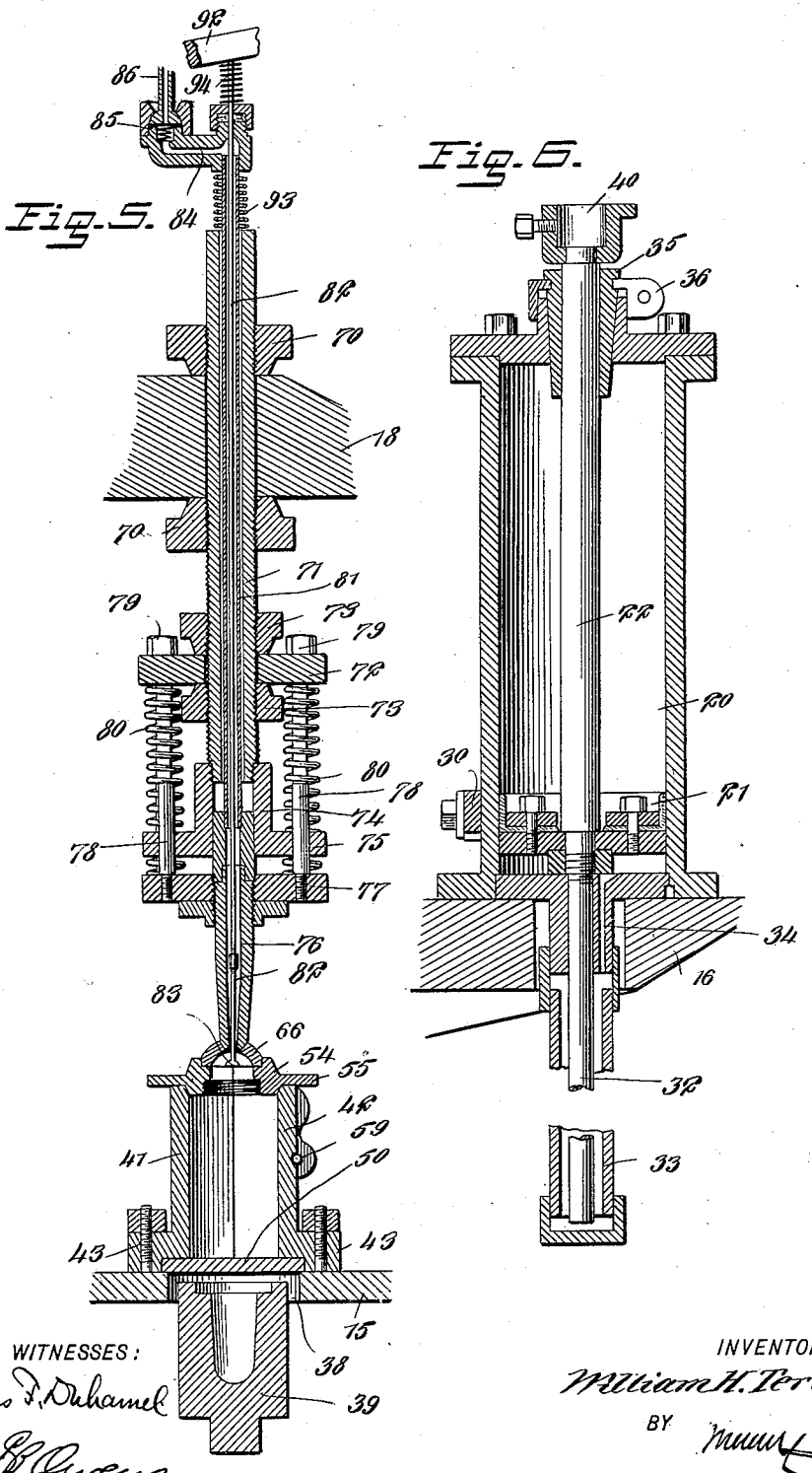

No. 711,800. Patented Oct. 21, 1902.
W. H. TERLINDE.
GLASS BLOWING MACHINE.
(Application filed Nov. 4, 1901.)
(No Model.) 5 Sheets—Sheet 5.

WITNESSES:
James F. Duhamel.
J. B. Owens.

INVENTOR
William H. Terlinde
BY
ATTORNEYS

UNITED STATES PATENT OFFICE.

WILLIAM HERMAN TERLINDE, OF COUDERSPORT, PENNSYLVANIA, ASSIGNOR TO HIMSELF, AND PHILO C. BLAISDELL, OF BRADFORD, PENNSYLVANIA.

GLASS-BLOWING MACHINE.

SPECIFICATION forming part of Letters Patent No. 711,800, dated October 21, 1902.

Application filed November 4, 1901. Serial No. 81,108. (No model.)

*To all whom it may concern:*

Be it known that I, WILLIAM HERMAN TERLINDE, a citizen of the United States, and a resident of Coudersport, in the county of Potter and State of Pennsylvania, have invented a new and Improved Glass-Blowing Machine, of which the following is a full, clear, and exact description.

This invention relates to an apparatus for blowing glass in which there are embodied certain novel features of construction and arrangement, which will be hereinafter brought out.

This specification is a specific description of one form of the invention, while the claims are definitions of the actual scope thereof.

Reference is to be had to the accompanying drawings, forming a part of this specification, in which similar characters of reference indicate corresponding parts in all the views.

Figure 1:
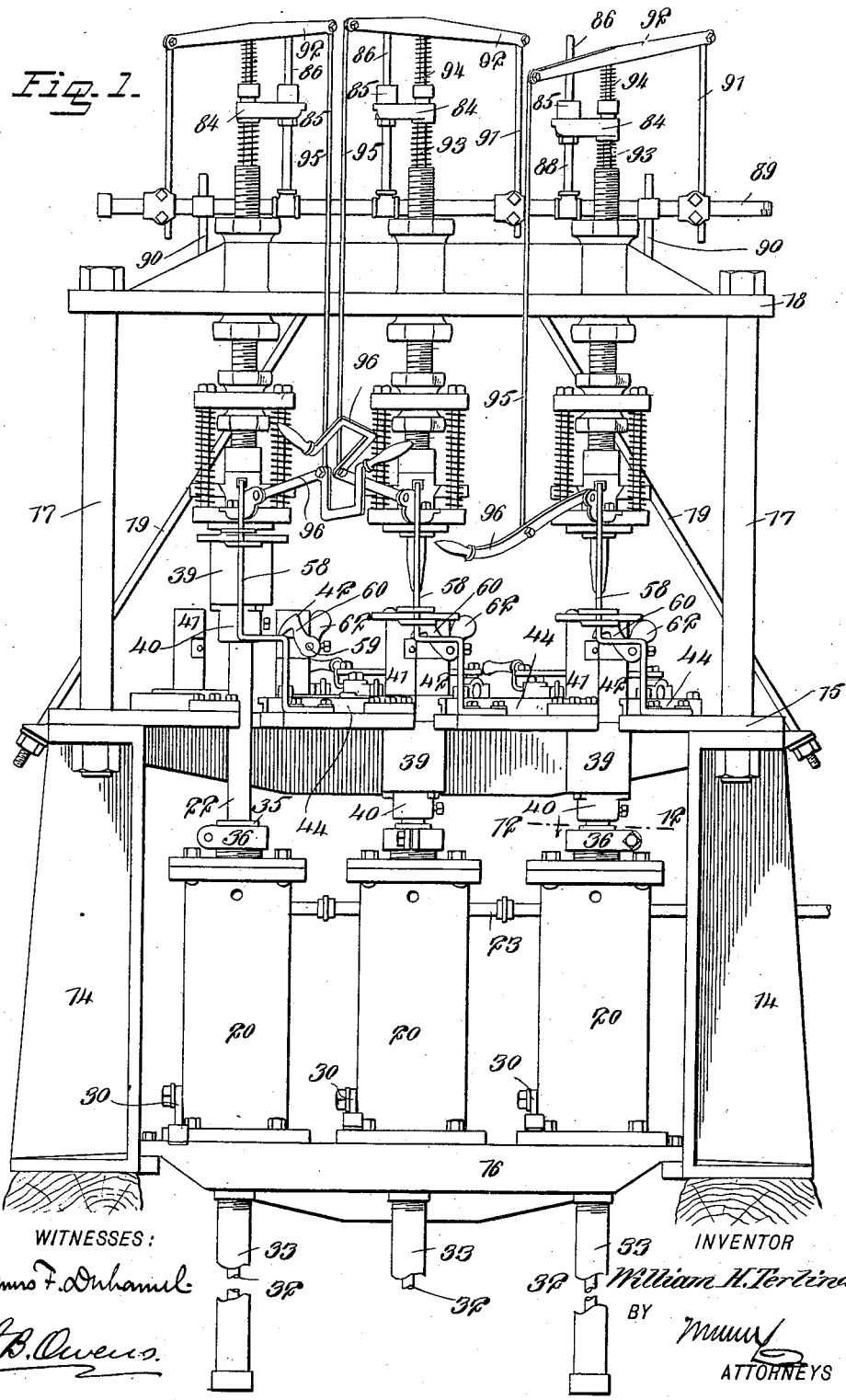
Figure 7:
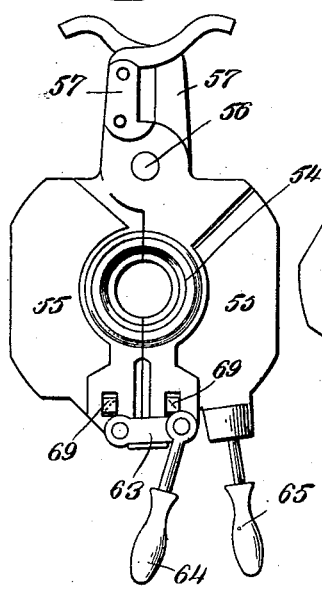
Figure 8:
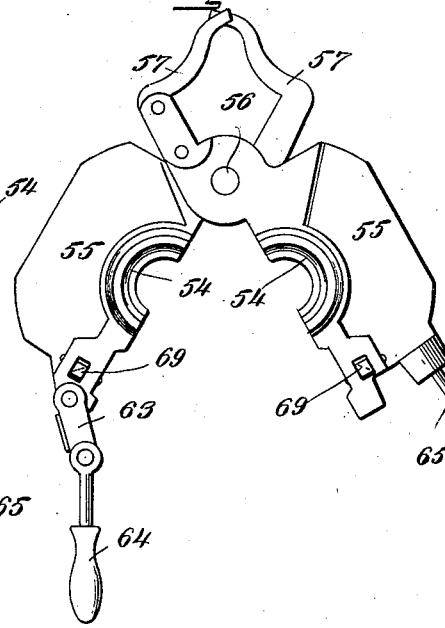
Figure 9:
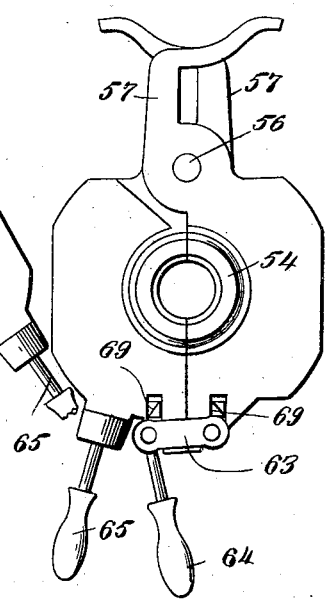
Figure 10:
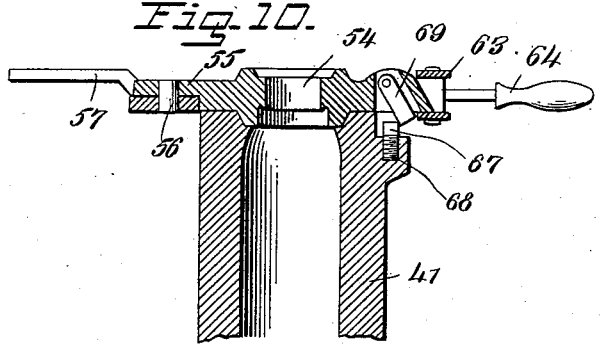
Figure 11:
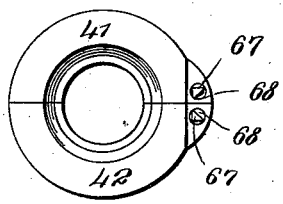
Figure 12:
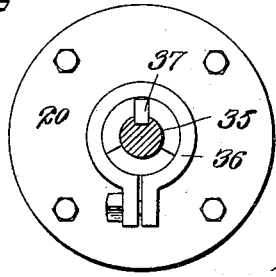

Figure 1 is a front view of the apparatus, showing portions broken away at the bottom of the machine. Fig. 2 is a rear elevation thereof. Fig. 3 is an end elevation. Fig. 4 is a plan view of the table, showing the molds and coacting parts. Fig. 5 is a vertical section taken through one of the blowpipes and molds. Fig. 6 is a section taken through one of the cylinders for operating the cups for the paste or molten glass. Figs. 7 and 8 are plan views of the neck-ring, said views showing the ring respectively in open and closed position. Fig. 9 is a bottom view of the said ring. Fig. 10 is a sectional view showing the ring and the upper part of the mold. Fig. 11 is a plan view of the mold, and Fig. 12 is a sectional plan view on the line 12 12 of Fig. 1.

The machine has a framing comprising pillars 14, supporting a bed-plate 16 and a table 15. From the pillars 14 rise stanchions 17, which support a headpiece 18.

19 represents tie-rods for insuring the rigidity of the frame.

I have shown the machine as provided with a gang of three blowing devices, which are essentially duplicates of each other. Obviously the machine could be constructed with any number of these devices.

On the bed-plate 16 are mounted the cylinders 20, wherein are arranged pistons 21, connected with rods 22. These pistons 21 are driven by any suitable fluid-pressure supplied through a pipe 23, having branches 24 passing down to a three-way cock 25. The cocks 25 communicate with the interior of the cylinders 20 through the medium of pipes 26, passing down to the lower ends of the cylinders. (See Fig. 2.) The cocks 25 also communicate with exhaust or vent pipes 27. The pipes 24 and 27 may be fitted with suitable hand-valves, if desired.

28 represents an arm for each cock 25, these arms being connected with the stems of the cocks by means of helical springs 29.

30 indicates treadles respectively connected with the arms 28 through the medium of links 31. The springs 29 act to throw the arms 28 downward, thus normally raising the front ends of the treadles 30. When these treadles are depressed, the rear ends of the treadles are thrown upward. (See the extreme right-hand side of Fig. 2.) This acts on the valve 25, so as to open communication between the pipes 24 and 26 and close the pipe 27. The fluid-pressure now enters the cylinder 20. When the treadle 30 is released, the spring 29 asserts itself, throwing the valve 25, so as to close the pipe 24 and connect together the pipes 26 and 27, thus exhausting the pressure within the cylinder, the piston of which thereupon returns by gravity.

32 indicates a guide extension which is provided for each piston-rod 22, these extensions passing downward through glands in the lower ends of the cylinders and into tubular extensions 33 of the cylinders. (See Figs. 1, 2, and 6.)

34 indicates an air-passage for permitting the free circulation of air in the cylinder extensions 33.

As shown in Figs. 1, 2, 6, and 12, the upper head of each cylinder 20 is provided with a packing made up of tapered segmental sections 35, held in a clamp 36. Through this packing the rod 22 moves, and between two of the packing-sections 35 is held rigidly a feather 37, which runs in a keyway in the rod 22, thus preventing the rod from turning.

The table 15 is provided with a number of orifices 38, (see Fig. 5,) which are one for each cylinder 20 and through which are adapted to pass the cups 39, carrying the molten glass. These cups are mounted fixedly in socket-pieces 40 and attached, respectively, to the piston-rods 22.

On the table 15, adjacent to each opening 38 thereof, is a mold. These molds are made up of two semicylindrical sections 41 and 42. Each mold-section is carried on a slide 43, and these slides are held in slideways 44, so as to move toward and from each other transversely of the machine. (See Fig. 4.)

45 indicates levers which are fulcrumed at the points 46 and which are one for each mold. These levers, respectively, have sliding connection with one slide 43 of each pair, and each lever carries pivotally a curved link 47, which passes around the rear side of the corresponding mold and is pivotally connected to a swinging arm 48, pivoted at 49 and having sliding connection with the other slide of the adjacent pair. It is clear that by throwing the lever 45 from one position to the other the slides 43, with their mold-sections, will be moved toward and from each other, and the mold-sections will be thereby opened or closed.

Mounted on the table 15 to slide forward and back at right angles to the direction of movement of the slides 43 are ejector-plates 50, which are one for each mold and which are held in guides 51, fastened to the table. These ejector-plates 50 are adapted to move under the corresponding mold, as indicated in Fig. 5, to cover the adjacent parts of the orifices 38 in the table 15, and thereby form the bottom of the mold. After the ware has been blown and the mold is opened, as shown in Fig. 4, the plate 50 should be retracted—that is to say, moved into the position shown in the upper part of said view—and it will carry out with it the finished ware to a position from which the ware may readily be removed. The dotted circle on the uppermost plate 50 in Fig. 4 indicates the position of the ware when thus removed or ejected.

52 indicates stop-plates which are fastened to the front edge of the table 15 and project rearward under the respective molds, so as to limit the forward movement of the plates 50.

The ejector-plates 50 are driven by levers 53, fulcrumed intermediate their ends and slidably connected with the levers 45 and with the plates 50, said connection being of such character that the ejecting movement of the plates 50 does not take place until after the beginning of the opening movement of the sections of the molds—that is to say, until the mold-sections have opened sufficiently to permit the ware to clear them in its outward movement. When the parts are thrown to the position shown in the upper part of Fig. 4, the cups 39 are capable of movement upward through the openings 38 and between the mold-sections to a point above them, as will be hereinafter fully explained. The mold-sections when closed are held together by locking devices, each of which comprises a rock-shaft 59, mounted on the mold-sections 42 and carrying hooks or latches 60, arranged to engage studs 61 on the mold-sections 41. Attached to each rock-shaft 59, at the projected rear end thereof, are weighted arms 62, which serve not only as handles for manually throwing the rock-shafts into and out of position, but also as weights for holding the shafts in either of the two positions in which they may be placed.

Arranged to work with each mold is a neck-ring, comprising a ring proper, 54, in two semicircular sections, said sections having aprons 55, pivotally connected together at the point 56. The ring 54 is formed internally with threads or other formations to be impressed on the neck or mouth of the ware molded. (See Fig. 5.) Each apron 55 carries a forwardly-extended finger 57, said fingers being angular, as shown, and lying one above the other, so that whether the sections be closed, as in Fig. 7, or open, as in Fig. 8, the crossing fingers 57 still form a sort of eye or inclosure through which may loosely pass the guide-arms 58. (See Figs. 1 and 4.) These guide-arms extend upward and serve to hold the rings 54 in the proper axial position. The sections of the ring 54 are held in closed position by a link 63, which is pivoted on one section and engageable with the other section, as shown in Fig. 7. This link 63 carries a handle 64 for facilitating its manipulation. The ring-section other than that to which the link 63 is pivoted carries a rigid handle-piece 65. This handle-piece facilitates the movement of the sections toward and from each other. As shown in Figs. 5 and 10, the rings 54 are matched on the upper ends of the respective molds, and each ring 54 is fitted at its upper end to receive a cap 66, which is placed loosely thereon and serves a purpose which will be hereinafter described. As shown best in Figs. 10 and 11, the mold-sections 41 and 42 are respectively provided with beveled studs 67, projected upward from lugs 68, formed on the mold-sections. Each section of the ring 54 carries pivotally a beveled latch 69, which latches are hung in recesses formed in the ring-sections and are arranged to move outward, so as to clear the studs or pins 67, seated in recesses 68 in the mold-sections. The studs 67 have square outer side faces, and the dogs 69 have their square faces in the same position. When the rings and molds are engaged together in closed position, as shown at the left-hand side of Fig. 2, the dogs 69 hang vertically, with the studs 67 lying immediately between them, thus engaging together their square sides and making it impossible for the mold-sections to be moved apart until this engagement has been broken. Should the ring be in closed position and the mold-sections move together, the inclined or beveled faces of the pins 67 will strike the correspondingly-beveled faces of the latches 69, and the latches will be rocked outward, as indicated in Fig. 10, thus permitting the pins 67 to pass between the latches 69, after which the latches will fall back to their vertical or latched position.

Adjustably fastened in the headpiece 18 by lock-nuts 70 are stout tubes 71, (see Fig. 5,) which carry at their lower portions a cross head or piece 72, fastened rigidly, yet adjustably, by means of lock-nuts 73. The tube 71 carries fast at its lower end a socket-piece 74, having a flanged lower end 75, forming a cross-piece somewhat similar to the cross-piece 72. Slidably fitted in the socket-piece 74 is a blow-nozzle 76, on which is fastened a cross-piece 77, the guide-pins 78 of which play loosely in the cross-piece 75. The cross-pieces 72 and 77 are connected together by tie-rods 79 and springs 80, which springs serve yieldingly to sustain the cross-piece 77 and the parts attached thereto against upward pressure. They do not, however, interfere with the downward movement of these parts under operations to be hereinafter described. The blowpipe 81 extends down through the tube 71 and is fastened securely in the upper end of the nozzle 76, and through the blow-pipe extends the stem 82 of a valve 83, which works within the mouth of the nozzle 76 to open or close the same. The blowpipe 81 projects upward above the tube 71 and carries fast at its upper end a tube-section 84, across which the stem 82 of the valve 83 passes loosely. The tube-section 84 is connected by a coupling 85, of any approved construction, with a U-pipe 86, which passes rearward (see Figs. 1 and 3) and downward to a coupling 87 similar to the coupling 85. These couplings allow the pipe-sections limited relative movement and avoid the use of rubber hose, which is not desirable. The couplings 87 are joined to branch pipes 88, which extend down to the air-supply pipe 89. This pipe is held in the position shown by means of supports 90, which may be of any form desired. The pipes 89 also support vertical arms 91, on which are fulcrumed levers 92. These levers extend forward over the respective stems 82 of the valves 83 and are connected therewith, as indicated in Figs. 1, 2, and 5. This connection may be of any form, so long as it allows the hereinafter-described movements of the various parts.

Bearing between the upper end of the tube 71 and the pipe-section 84 is an expansive spring 93, and bearing between the upper side of the pipe-section 84 and the under side of the lever 92 is a spring 94. These springs are both expansive and encircle, respectively, the blowpipe 81 and the stem 82. The spring 94 is stronger than the spring 93, so that the spring 93 will give first when downward pressure is exerted by the lever.

Fastened to the forward ends of the levers 92 are rods 95, these rods projecting downward to hand-levers 96, fulcrumed, respectively, on the cross-pieces 77. (See Fig. 3.)

In practice the three divisions of the machine will be operated in a certain succession so as to facilitate the work, although according to the theory of my invention each of the blow devices may be worked independently. In operating the machine the glass-blower should stand in front of the machine and a "boy" or helper behind. A certain quantity of molten glass is placed in one of the cups 39 and the piston 21 is actuated to raise this cup into the position shown at the right-hand side of Fig. 2. Immediately previous to this movement the adjacent mold-sections should be separated, as shown. These sections being locked together by the latches 69 and pins 67 of the corresponding neck-ring, may be released from said latches by manually raising the ring sufficiently to clear the latches 69 from the pins 67. The sections of the mold being then thrown apart and the plate 50 being withdrawn the cup 39 with the molten glass or paste therein passes upward and lifts the ring 54 off of the mold. The ring is carried up to the lock-nut immediately below the cross-piece 77, and the blow-nozzle 76 is thus made to enter into the cup 39, so as to form an initial cavity in the object to be blown. At this period the springs 80 give slightly, and thus make a tight connection between the said lock-nut and the ring 54. The valve 83 being normally closed no air passes from the blow-nozzle at this stage of the operation. By manipulation of the proper treadle 30 the cup 39 is now lowered. The plastic or paste-like glass adheres to the ring, owing to the thread therein. The ring 54 falling with the cup 39 is again lodged on top of the mold. The cup 39 now leaves the glass blank and passes down to its lower position. (See the right-hand side of Fig. 1.) Then the mold, with its ejector-plate 50, should be returned to operative position, as shown in Fig. 5. At this period the glass will be in the mold suspended from the ring 54. The cap 66, which is placed on and removed from the machine from time to time as the operations require, should now be placed on top of the neck-ring 54. When this has been effected the proper lever 96 is thrown downward, causing the movement of the lever 92 to be applied to the spring 94. This spring being stronger than the spring 93, retains its normal relative position between the valve-stem 82 and blow-pipe 81, and the spring 93 gives to permit of moving bodily downward the blowpipe, the valves, the blow-nozzle, and the valve-stem. The couplings 85 and 87 allow these movements. As the blow-nozzle 76 moves into the position shown in Fig. 5 the nozzle will engage the cap 66 and a secure connection between the nozzle and the mold will be effected. As the downward movement of the lever 92 continues it finally overcomes the strength of the spring 94 and this spring gives, thereby bringing about a relative movement of the valve-stem 82 and valve 83 with respect to the blowpipe 81. This opens the valve 83, and the blast of air from the pipes 89, 86, and 81 is now free to pass through the nozzle 76 and into the mold to blow the glass into the proper form. When this operation has been finished, the ring 54 is raised slightly, so that the mold may be thrown open, and as the mold is thrown open the ejector-plate 50 operates and the finished article is drawn out onto the table 15. One complete operation will now have been performed and the machine is now ready for a repetition.

Having thus described my invention, I claim as new and desire to secure by Letters Patent—

1. In a glass-blowing machine, the combination of a ring movable vertically on and off of the mold, the ring being formed of sections pivotally connected and provided with crossing fingers, and a vertically-extending guide embraced by said crossing fingers.

2. A glass-blowing machine, having a ring adapted to move on and off of the mold, the ring being formed of two pivotally-connected sections, said sections having projecting fingers comprising outwardly-extending parallel portions and diagonally-extending crossing portions, and a guide-arm embraced by said fingers, to guide the ring.

3. In a glass-blowing machine, the combination with the mold, of a stationary tube sustained adjacent thereto, a blowpipe mounted in the stationary tube, a valve for closing the blowpipe, a stem attached to the valve and projected through the blowpipe, a spring bearing between the blowpipe and the stationary tube, a second spring bearing between the blowpipe and the valve-stem, said second-named spring being stronger than the first-named spring, and an operating device engaged with the valve-stem and second-named spring.

4. In a glass-blowing machine, the combination with a sectional mold having lock-pins thereon, of the sectional neck-ring having pivoted dogs working with the lock-pins, said lock-pins and dogs having beveled faces, for the purpose specified.

5. In a glass-blowing machine, the combination of the sectional mold, the sectional neck-ring engageable therewith, and dogs mounted pivotally on the sections of the neck-ring and arranged to engage with parts on the mold-sections, said dogs being movable outward to disengage said parts.

6. In a glass-blowing machine, the combination of a mold having a movable section, a neck-ring having a movable section, and a pivotally-mounted dog on the movable section and arranged to engage a part on the movable section of the mold, said dog being arranged to move on its pivot to disengage the mold-section.

7. In a glass-blowing machine, the combination of a mold having a movable section, a neck-ring having a movable section, and a pivotally-mounted dog carried on the movable section of the neck-ring and adapted to engage a part on the movable section of the mold, said dog having a beveled face acting automatically to throw the dog out of the path of the movable mold-section, to permit said section to lock with the dog.

8. In a glass-blowing machine, the combination of a neck-ring movable toward and from the mold and formed of pivotally-connected sections, said sections having crossing fingers forming an inclosure or eye, and a guide extending through said inclosure or eye and on which the neck-ring slides.

9. In a glass-blowing machine, the combination of a neck-ring formed of pivotally-connected sections, the neck-ring being movable toward and from the mold and each section of the neck-ring having a finger comprising straight outwardly-projected portions and diagonally-projected crossing portions, and a guide-arm straddled by said fingers, on which guide-arm the ring moves.

10. A glass-blowing machine, comprising a mold, a neck-ring loosely seated on the top thereof, a vertical guide on which the neck-ring is slidable vertically toward and from the mold, a blow-nozzle, and an orificed cap detachable from the machine and placed removably between the neck-ring and the blow-nozzle, substantially as described.

11. A glass-blowing machine, comprising a mold formed of sections moved to open or close the mold, a neck-ring also formed of sections movable to open and close, the neck-ring being loosely fitted on the mold, a vertical guide on which the neck-ring is movable vertically toward and from the mold, a blow-nozzle, and an orificed cap detachable from the machine and placed removably between the ring and blow-nozzle.

12. A glass-blowing machine, comprising a mold, a sectional neck-ring bearing removably thereon, a vertical guide on which the neck-ring is movable vertically toward and from the mold, a blow-nozzle, and an orificed cap detachable from the machine and placed removably between the neck-ring and blow-nozzle.

13. A glass-blowing machine, comprising a mold, a neck-ring mounted to move toward and from the mold, a blow-nozzle, and a separated orificed cap capable of being manually detached from the machine, said cap being placed removably between the neck-ring and blow-nozzle.

14. In a glass-blowing machine, the combination with a mold, of a blowpipe movable toward and from the mold, a valve for closing the blowpipe, springs of unequal strength sustaining the blowpipe and valve respectively, and means for operating the blowpipe and valve through the medium of said springs.

15. A glass-blowing machine, comprising a table or support having an orifice therein, a sectional mold mounted on the table or support over the orifice, an ejector sliding under the mold to constitute the bottom thereof and over the orifice to temporarily close it, means for operating the mold-sections and ejector in unison, means movable up through the orifice on the table to deliver the molten glass, and blow devices movable down to the mold.

16. A glass-blowing machine, comprising a table or support having an orifice therein, a sectional mold mounted on the table or support over the orifice, an ejector sliding under the mold to constitute the bottom thereof and over the orifice to temporarily close it, means for operating the mold-sections and ejector in unison, means movable up through the orifice on the table to deliver the molten glass, blow devices movable down to the mold, a neck-ring bearing loosely on the mold, and an orificed cap bearing between the neck-ring and blow devices.

17. A glass-blowing machine, comprising a table or support having an orifice therein, a sectional mold mounted on the table or support over the orifice, an ejector sliding under the mold to constitute the bottom thereof and over the orifice to temporarily close it, means for operating the mold-sections and ejector in unison, means movable up through the orifice on the table to deliver the molten glass, blow devices movable down to the mold, a neck-ring bearing loosely on the mold, an orificed cap bearing between the neck-ring and blow devices, and a guide on which the neck-ring is mounted to move toward and from the mold.

In testimony whereof I have signed my name to this specification in the presence of two subscribing witnesses.

WILLIAM HERMAN TERLINDE.

Witnesses:
 W. E. BURDICK,
 WILLIAM B. CLARKE.